May 30, 1933.    R. B. BRANDL    1,911,602
VENTILATING SYSTEM FOR GRAIN STORAGE BINS
Filed May 31, 1930    2 Sheets-Sheet 2
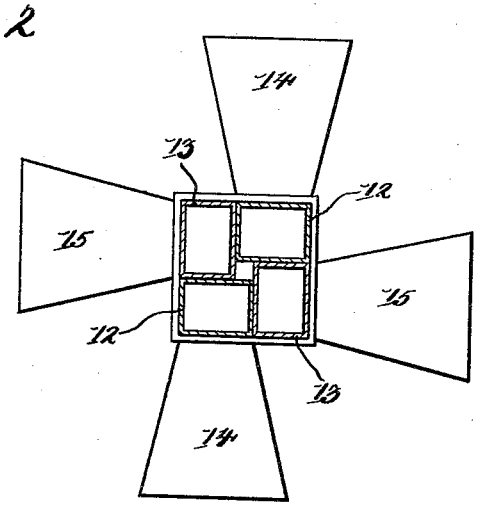
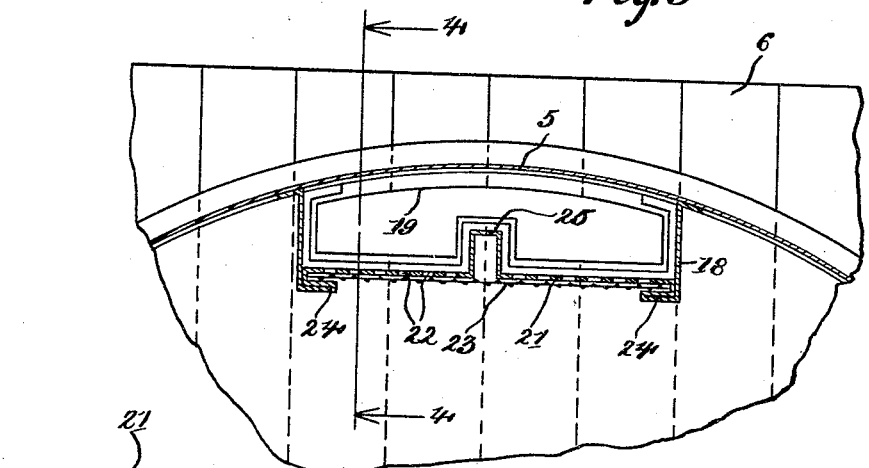
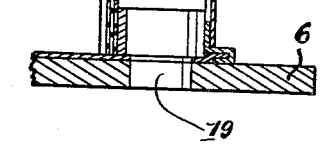
Inventor
Robert B. Brandl
By Stryker & Stryker
Attorneys Patented May 30, 1933

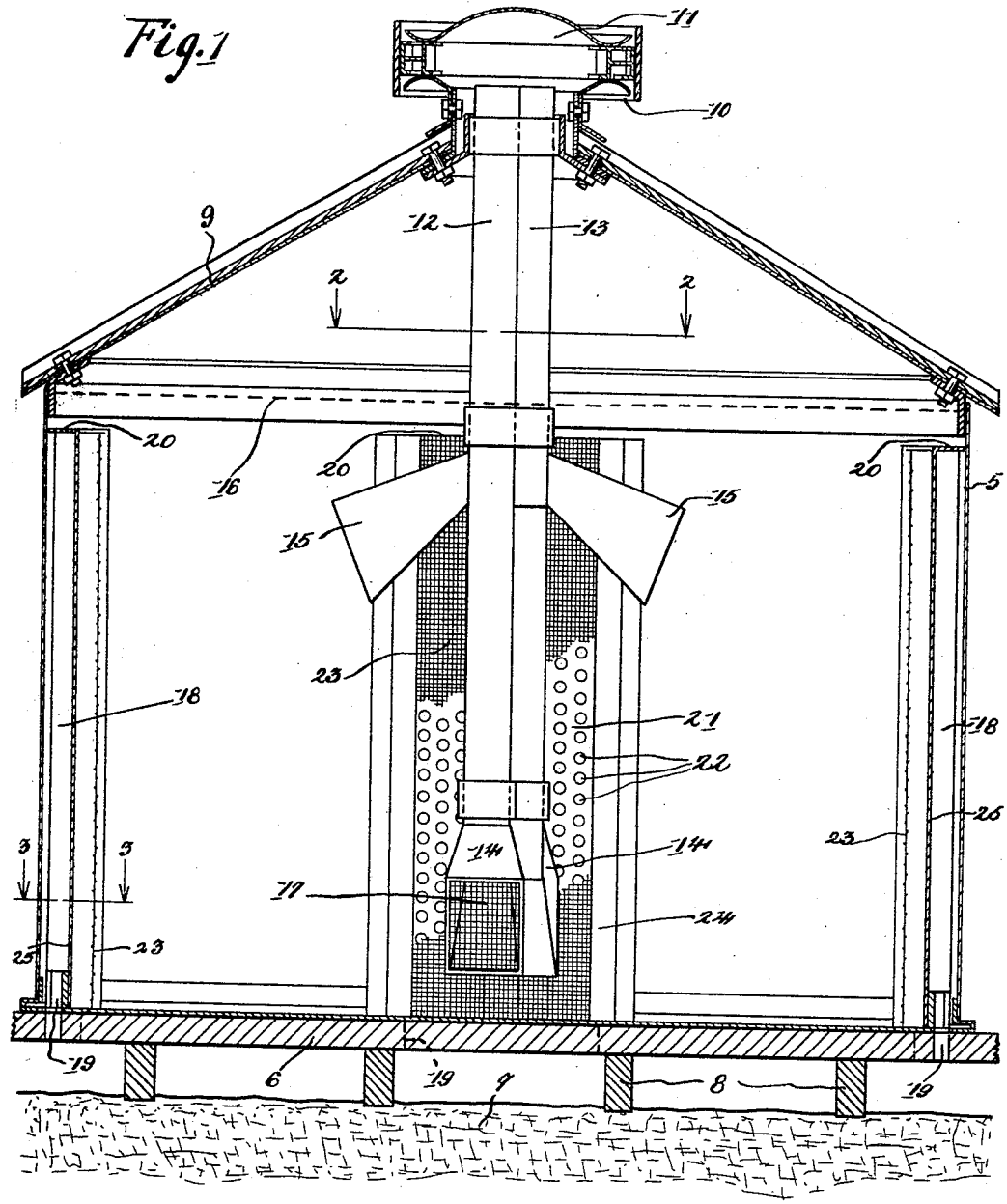

1,911,602

UNITED STATES PATENT OFFICE

ROBERT B. BRANDL, OF ST. PAUL, MINNESOTA; LILLIAN BRANDL EXECUTRIX OF SAID ROBERT B. BRANDL, DECEASED

VENTILATING SYSTEM FOR GRAIN STORAGE BINS

Application filed May 31, 1930. Serial No. 458,699.

It is the object of this invention to provide efficient means for inducing the passage of relatively dry air through a body of grain in a bin or the like without the use of power-driven fans or blowers.

The use of "combines" in harvesting has resulted in delivery of grain at the places of storage in a relatively moist condition. Obviously this increases the difficulties attendant on proper storage and makes effective ventilation in the storage bins necessary. Ventilating systems requiring power-driven blowers are seldom practical on farms or in smaller villages where it is frequently desirable to store large quantities of grain. My invention secures good ventilation and is adapted for use where the bins are inspected and sealed under governmental authority or in connection with the bins of cooperative associations which purchase the grain when it is stored for future delivery.

In the accompanying drawings Figure 1 is a central vertical section through a grain bin constructed from sheet metal and having my improved ventilating system incorporated therein; Fig. 2 is a horizontal section through the air discharge flues taken on the line 2—2 of Fig. 1; Fig. 3 is a horizontal section through one of the air intake shafts taken on the line 3—3 of Fig. 1 and Fig. 4 is a horizontal section through the lower portion of one of the air intake shafts taken on the line 4—4 of Fig. 3.

The bin illustrated has a cylindrical body portion 5 constructed from sheet metal and supported on a suitable floor 6. This floor is preferably spaced from the foundation 7 by floor joists 8 or the like. A conical roof 9 has at its apex a roof ventilator 10 of suitable or well known construction designed to create suction in an inner chamber 11 under the influence of external air currents. Communicating at their upper ends with the chamber 11 are a plurality of air discharge flues 12 and 13 having intake funnels 14 and 15 respectively communicating with their lower ends. The funnels 14 are preferably located near the bottom of the grain body while the funnels 15 are located so as to withdraw air from near the upper surface of the grain body, which usually fills the bin to about the level of the dotted line 16 (Fig. 1). The open lower ends of the funnels 14 and 15 are preferably covered by wire screening 17 to exclude grain from said funnels and from the flues 12 and 13.

At suitable spaced intervals around the walls 5 of the bin are located air intake shafts 18 having air inlet passages 19 communicating therewith at their lower ends through the floor 6. The upper ends 20 of the shafts 18 are closed and are located near the upper surface 16 of the grain so that the shafts 18 extend vertically substantially from the bottom to the top of the body of grain in the bin. An inner casing member 21 of each shaft 18 is formed with a multiplicity of perforations 22 which are distributed from top to bottom of the shaft to allow the escape of air into the body of the grain. These openings 22 are covered by fine mesh wire screening 23 which excludes the grain from the air shafts. To hold the screening 23 in place flanges 24 are formed along the vertical edges of the members 21. Each member 21 is reinforced against the outward pressure of the grain by the formation of a channel member 25 centrally therein and extending from top to bottom of the air shaft.

It will be understood that the metal wall portions 5 of the bin are good conductors of heat, and particularly when the sun is shining on these walls, they are normally at a higher temperature than the body of grain in the bin. Thus the columns of air in the shafts 18 are heated by contact with the wall portions 5 so that the air in the shafts expands and passes into the body of grain through the openings 22 and screen 23, being replaced by air admitted through the intake passages 19. The capacity of the air thus warmed to take up moisture is increased and in passing into and through the body of grain has a drying effect. The suction created in the chamber 11 is transmitted through the flues 12 and 13 to the funnels 14 and 15 so that the moisture laden air is withdrawn from the grain body through said flues and passes out through the roof ventilator 10. It is important to note that the columns of air in the shaft 18 are not permitted to pass directly out through the upper surface of the grain but are forced to pass through the body of grain to the funnels 14 and 15.

I prefer to line the greater part of the walls 5 with suitable heat insulating material (not shown) leaving only the portions constituting the outer casing of the air shafts 18 unlined. My ventilating system has been found to operate efficiently in metal bins of from 1000 to 1500 bushel capacity. It has the further advantage of allowing the escape of water of condensation in case warm, moisture laden air enters and condenses on the inner casing member 21. Such water of condensation passes out through the air intake passage 19.

Having described my invention what I claim as new and desire to protect by Letters Patent is:

1. In ventilating means for a grain bin having outer wall portions of heat conducting material, a plurality of spaced air shafts in the bin to distribute air through the body of grain, said wall portions constituting the outer casings of said shafts, said shafts having foraminous inner casing members, means for excluding the grain from passage through said foraminous members, intake passages communicating with the lower ends of said shafts, the upper ends of said shafts being closed and located near the upper surface of the grain in the bin, a plurality of air discharge flues communicating at their lower ends with the central portion of the grain body at different depths therein and a roof ventilator communicating with the upper ends of said flues.

2. In ventilating means for an individual grain bin having sheet metal outer walls, a plurality of horizontally spaced air shafts extending upward in the bin to distribute air through the body of the grain at substantially opposite sides of the bin, portions of said walls constituting the outer casings of said shafts, foraminous members for excluding the grain from said shafts, intake passages communicating with the lower ends of said shafts, a floor having openings for said intake passages but being otherwise impervious, the upper portion of the bin constituting an air chamber communicating with the entire upper surface of the grain in the bin, a roof ventilator communicating with said chamber and means for closing the upper ends of said shafts to prevent direct communication between said shafts and air chamber.

3. In ventilating means for an individual grain bin having cylindrical, sheet metal outer walls, a plurality of horizontally spaced air shafts extending upward in the bin to distribute air through the body of the grain at spaced points around the periphery of the bin, portions of said wall constituting the outer casings of said shafts, foraminous members for excluding the grain from said shafts, intake passages communicating with the lower ends of said shafts, the upper portion of the bin constituting an air chamber communicating with the entire upper surface of the grain in the bin, a roof ventilator communicating with said chamber, an outlet flue communicating at its lower end solely with the grain at a central point beneath the surface thereof, a floor having openings for said intake passages but being otherwise impervious and the upper end of said flue being in communication with said ventilator and means for closing the upper ends of said shafts to prevent direct communication between said shafts and air chamber.

In testimony whereof, I have hereunto signed my name to this specification.

ROBERT B. BRANDL.